(12) United States Patent
Uo

(10) Patent No.: US 8,731,407 B2
(45) Date of Patent: May 20, 2014

(54) OPTICALLY COUPLED INSULATING DEVICE

(71) Applicant: Kabushiki Kaisha Toshiba, Tokyo (JP)

(72) Inventor: Toyoaki Uo, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/867,493

(22) Filed: Apr. 22, 2013

(65) Prior Publication Data

US 2013/0236191 A1    Sep. 12, 2013

Related U.S. Application Data

(63) Continuation of application No. 13/015,830, filed on Jan. 28, 2011, now Pat. No. 8,447,185.

(30) Foreign Application Priority Data

Jan. 29, 2010   (JP) .................................. 2010-018769

(51) Int. Cl.
*H04B 10/00* (2013.01)

(52) U.S. Cl.
USPC .......................................... 398/138; 398/135

(58) Field of Classification Search
USPC ......................... 398/135–139, 140, 182, 202
See application file for complete search history.

(56) References Cited

U.S. PATENT DOCUMENTS

| | | | | |
|---|---|---|---|---|
| 4,713,841 A | * | 12/1987 | Porter et al. .................. | 398/191 |
| 4,843,339 A | * | 6/1989 | Burt et al. ....................... | 330/10 |
| 5,255,111 A | * | 10/1993 | Kwa .............................. | 398/138 |
| 5,287,107 A | * | 2/1994 | Gampell et al. ............... | 341/137 |
| 6,140,952 A | * | 10/2000 | Gaboury ........................ | 341/143 |
| 6,151,149 A | * | 11/2000 | Rybicki et al. ................. | 398/191 |
| 6,323,796 B1 | * | 11/2001 | Krone et al. ................... | 341/143 |
| 6,385,235 B1 | * | 5/2002 | Scott et al. .................... | 375/220 |
| 6,617,988 B1 | * | 9/2003 | Lindemann .................... | 341/143 |
| 6,661,975 B1 | * | 12/2003 | Hall et al. ...................... | 398/180 |
| 6,678,478 B1 | * | 1/2004 | Ono et al. ...................... | 398/141 |

(Continued)

FOREIGN PATENT DOCUMENTS

| | | |
|---|---|---|
| JP | 2006303663 | 11/2006 |
| JP | 2008-270640 A | 11/2008 |
| JP | 2009-071153 A | 4/2009 |

OTHER PUBLICATIONS

Japanese Office Action for Japanese Application No. 2010-018769 mailed on Nov. 20, 2012.

(Continued)

*Primary Examiner* — Agustin Bello
(74) *Attorney, Agent, or Firm* — White & Case LLP

(57) ABSTRACT

According to one embodiment, an optically coupled insulating device includes an optical transmitter and an optical receiver. The optical transmitter includes an analog-to-digital converter, an encoder, a transmitting controller, and an electrooptical transducer. The encoder is configured to generate a transmitting signal by superimposing an output of the analog-to-digital converter onto a signal based on a clock signal. The transmitting signal is encoded to have an average duty ratio of more than zero and less than one. The transmitting controller is configured to output one of the transmitting signal and the output of the analog-to-digital converter depending on an input level of the analog signal. The electrooptical transducer is configured to convert an output of the transmitting controller into an optical signal. The optical receiver includes an optoelectrical transducer, a decoder, and a receiving controller.

10 Claims, 4 Drawing Sheets

(56) References Cited

U.S. PATENT DOCUMENTS

| | | | |
|---|---|---|---|
| 7,146,283 B2 * | 12/2006 | Daigle et al. | 702/107 |
| 7,148,744 B2 * | 12/2006 | Bailey et al. | 330/9 |
| 7,301,995 B2 * | 11/2007 | Scott et al. | 375/220 |
| 7,304,594 B2 * | 12/2007 | Sakura et al. | 341/143 |
| 7,369,067 B2 * | 5/2008 | Kishi et al. | 341/53 |
| 7,463,675 B2 * | 12/2008 | Scott et al. | 375/220 |
| 7,526,206 B1 * | 4/2009 | Rolenz | 398/140 |
| 7,738,796 B2 * | 6/2010 | Sanchez | 398/197 |
| 7,821,437 B1 * | 10/2010 | Rud et al. | 341/123 |
| 7,961,815 B2 * | 6/2011 | Feher | 375/302 |
| 8,260,145 B2 * | 9/2012 | Gupta et al. | 398/115 |
| 2008/0265185 A1 | 10/2008 | Numano | |
| 2009/0073626 A1 | 3/2009 | Saitou | |
| 2011/0188864 A1 * | 8/2011 | Uo | 398/154 |
| 2012/0014698 A1 * | 1/2012 | Rotenstein | 398/158 |
| 2013/0039648 A1 * | 2/2013 | Uo | 398/25 |

OTHER PUBLICATIONS

Japanese Office Action for Japanese Application No. 2010-018769 mailed on Feb. 4, 2013.

Japanese Office Action issued on Jan. 24, 2014 in corresponding Japanese Application No. 2013-095546, along with English translation.

\* cited by examiner

| SCRAMBLE SIGNAL | OUTPUT OF ADC | DUTY RATIO |
|---|---|---|
| L | L | $W_1$ |
| L | H | $W_2$ |
| H | L | $W_3$ |
| H | H | $W_4$ |

| SCRAMBLE SIGNAL | OUTPUT OF ADC | DUTY RATIO | PULSE WAVEFORM |
|---|---|---|---|
| L | L | $W_1 = 20\%$ |  |
| L | H | $W_2 = 40\%$ |  |
| H | L | $W_3 = 80\%$ |  |
| H | H | $W_4 = 60\%$ |  |

| SCRAMBLE SIGNAL | OUTPUT OF ADC | DUTY RATIO | PULSE WAVEFORM |
|---|---|---|---|
| L | L | $W_1 = 25\%$ |  |
| L | H | $W_2 = 50\%$ |  |
| H | | |  |
| H | L | $W_3 = 75\%$ |  |

OPTICALLY COUPLED INSULATING DEVICE

CROSS-REFERENCE TO RELATED APPLICATION

This application is a Continuation of application Ser. No. 13/015,830 filed Jan. 28, 2011; the entire contents of which are incorporated herein by reference.

This application is based upon and claims the benefit of priority from Japanese Patent Application No. 2010-018769, filed on Jan. 29, 2010; the entire contents of which are incorporated herein by reference.

FIELD

Embodiments described herein relate generally to an optical transmitter, an optical receiver, and an optically coupled insulating device.

BACKGROUND

Insulating circuits having high noise immunity such as insulating amplifiers are used in environments such as electric vehicles and apparatuses for factory automation where high power electrical devices coexist with highly sensitive electronic devices. Optically coupled insulating devices such as photocouplers that optically transmit signals have excellent noise immunity because complete electrical insulation is provided between inputs and outputs.

In optically coupled insulating devices, analog signal data can be transmitted with high precision to circumvent nonlinearity of photocouplers and the like by converting detected analog signals into digital signals before being transmitted optically. Further, optically coupled insulating devices have been proposed in which encoded digital signals and clock signals are transmitted by photocouplers and the like in order to reduce the number of transmission lines (for example, refer to JP-A 2006-303663 (Kokai)).

With regard to optical connection of optically coupled insulating devices, verification of normal transmission is necessary during the specified guarantee period even if temperature change and aging degradation of a light emitting element such as a light emitting diode (LED) occur. Simplified testing methods are preferable in a product testing process for the optically coupled insulating devices.

DETAILED DESCRIPTION

Figure 1:
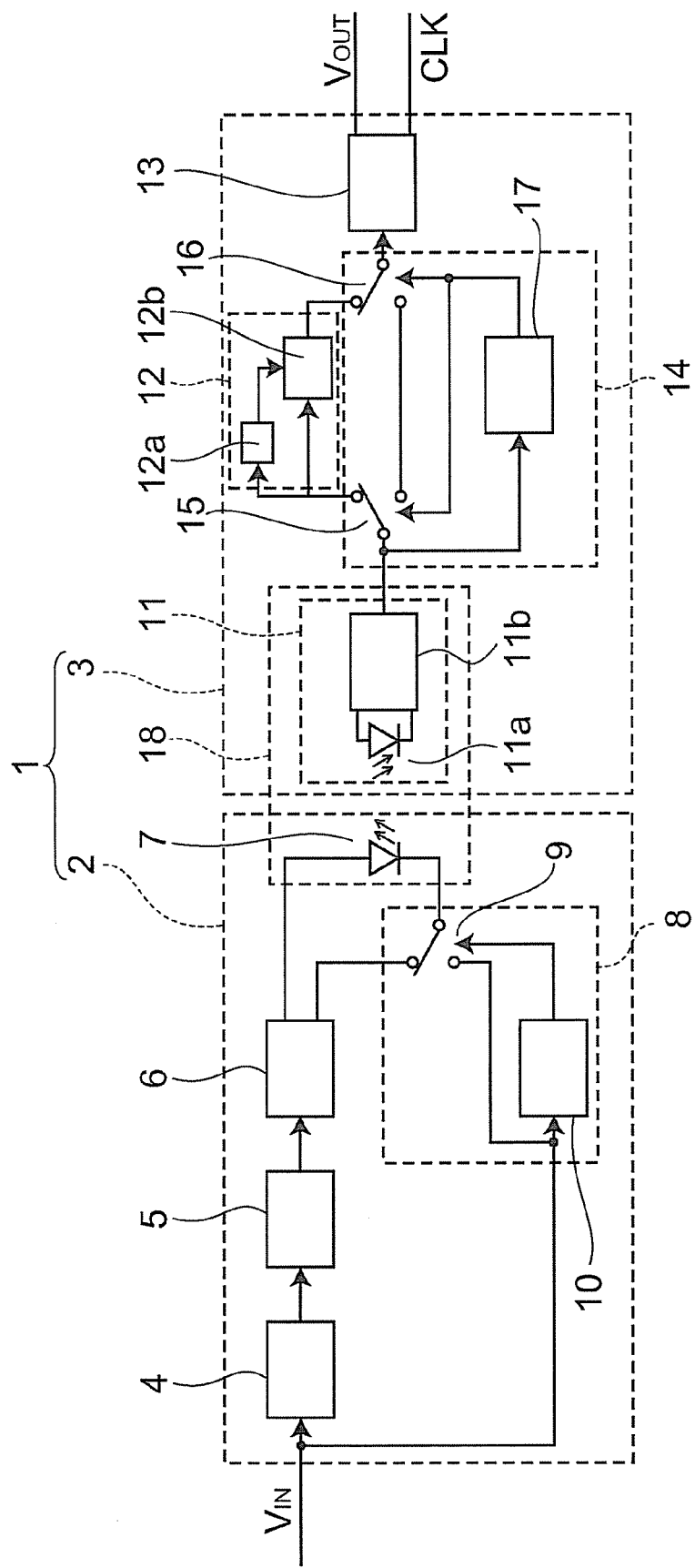
FIG. 1 is a block diagram illustrating the configuration of an optically coupled insulating device including an optical transmitter and an optical receiver according to an embodiment.

In general, according to one embodiment, an optically coupled insulating device includes an optical transmitter and an optical receiver. The optical transmitter includes an analog-to-digital converter, an encoder, a transmitting controller, and an electrooptical transducer. The analog-to-digital converter is configured to convert an analog signal into a digital signal. The encoder is configured to generate a transmitting signal by superimposing an output of the analog-to-digital converter onto a signal based on a clock signal. The transmitting signal is encoded to have an average duty ratio of more than zero and less than one. The transmitting controller is configured to output one of the transmitting signal and the output of the analog-to-digital converter depending on an input level of the analog signal. The electrooptical transducer is configured to convert an output of the transmitting controller into an optical signal. The optical receiver includes an optoelectrical transducer, a decoder, and a receiving controller. The optoelectrical transducer is configured to receive the optical signal and to convert the optical signal into an electrical signal. The decoder is configured to decode an output of the optoelectrical transducer and to output a regenerated digital signal and a regenerated clock signal. The receiving controller is configured to output one of an output of the decoder and the output of the optoelectrical transducer depending on an average duty ratio of the output of the optoelectrical transducer.

Embodiments will now be described in detail with reference to the drawings. In the specification and the drawings of the application, components similar to those described in regard to a drawing thereinabove are marked with like reference numerals, and a detailed description is omitted as appropriate. Furthermore, L denotes a logical value of a low-level and H denotes a logical value of a high-level.

FIG. 1 is a block diagram illustrating the configuration of an optically coupled insulating device including an optical transmitter and an optical receiver according to an embodiment.

The optically coupled insulating device 1 includes the optical transmitter 2 and the optical receiver 3 as illustrated in FIG. 1.

The optical transmitter 2 will now be described.

The optical transmitter 2 includes an analog-to-digital converter 4, an encoder 5, a driver 6, an electrooptical transducer 7, and a transmission controller 8. The analog-to-digital converter 4, the encoder 5, the driver 6, and the transmission controller 8 are formed in the same semiconductor substrate to provide a one-chip structure.

The analog-to-digital converter 4 samples an analog signal input with a sampling period determined by a clock signal and converts the analog signal into a digital signal. The analog-to-digital converter 4 digitizes the analog signal input with desired precision and outputs as, for example, an n-bit digital signal (n being a positive integer). As the analog-to-digital converter 4, for example, a delta-sigma analog-to-digital converter ($\Delta\Sigma ADC$) may be used. In this case, a digital signal to be output is low bit, e.g., one-bit data, and the configuration of the encoder 5 is simplified.

The output of the analog-to-digital converter 4 is synchronized with the clock signal and is input to the encoder 5.

The encoder 5 encodes the digital signal of the output of the analog-to-digital converter 4 and the clock signal into a transmitting signal, e.g., a PWM signal, of one transmission line. In other words, the encoder 5 generates the transmitting signal in which the output of the analog-to-digital converter 4 is superimposed onto the clock signal. The transmitting signal is encoded to have an average duty ratio D of more than zero and less than one. The not-illustrated clock signal is generated by a clock generator (not illustrated) formed the same semiconductor substrate or an external clock generator (not illustrated) and applied to the analog-to-digital converter 4. The clock signal defines a sampling period.

The output of the analog-to-digital converter 4 can be any value from consecutive Ls to consecutive Hs. However, the transmitting signal of the output of the encoder 5 is decoded to a regenerated digital signal and a regenerated clock signal by the optical receiver 3, as described below. Therefore, the transmitting signal is encoded by the encoder 5 so that the optical receiver 3 can regenerate a clock signal from the transmitting signal.

Therefore, the average duty ratio D of the transmitting signal is within specified values between zero and one, which is determined by an encoding scheme, and neither zero nor one. Further, in order to easily regenerate the clock signal, the transmitting signal is encoded so that periods of consecutive Ls and consecutive Hs (run length) are not too long with respect to the period of the clock signal. Therefore, the specified values of the average duty ratio D of the transmitting signal are proximal to middle values between zero and one, and proximal to neither zero nor one.

The electrooptical transducer 7 converts the output of the transmission controller 8 into an optical signal and outputs the optical signal. The electrooptical transducer 7 consists of, for example, a light emitting element such as a LED.

The electrooptical transducer 7 converts the transmitting signal output from the encoder 5 or the analog signal input via the transmission controller 8 into an optical signal, as described below.

The driver 6 receives the transmitting signal of the output of the encoder 5 and outputs the transmitting signal to the transmission controller 8. In FIG. 1, the configuration is illustrated in which the driver 6 is connected to an LED as the electrooptical transducer 7 and draws in currents from the cathode side of the LED. However, the driver 6 may pass currents into, for example, the anode side of the LED. Alternatively, the driver 6 may be included in the encoder 5.

The transmission controller 8 includes a switching element 9 and a switch controller 10. The switching element 9 outputs one selected from the output of the driver 6 and the analog signal input. The switch controller 10 controls the switching element 9 by determining whether a normal operating state or a testing state for an optical connection depending on an input level $V_{IN}$ of the analog signal.

The switch controller 10 controls the switching element 9 to the normal operating state or the testing state for an optical connection depending on the input level $V_{IN}$ of the analog signal with respect to, for example, the maximum value (full scale input) $V_{IN\_MAX}$ of the input level of the analog-to-digital converter 4. In the normal operating state, the input level of the analog signal is limited in $V_{IN} < V_{IN\_MAX}$. In this case, the switch controller 10 controls the switching element 9 as the normal operating state to output the output of the encoder 5 via the driver 6. In the testing state for the optical connection, the input level of the analog signal is set in $V_{IN} > V_{IN\_MAX}$. In this case, the switch controller 10 controls the switching element 9 as the testing state for the optical connection to output the analog signal input.

Therefore, the transmission controller 8 outputs the output of the encoder 5 to the electrooptical transducer 7 via the driver 6 in the normal operating state. The transmission controller 8 outputs the analog signal input to the electrooptical transducer 7 in the testing state for the optical connection.

The optical transmitter 2 is controlled in the normal operating state or the testing state for the optical connection by the transmission controller 8 depending on the input level $V_{IN}$ of the analog signal.

When the withstand voltage of the optical transmitter 2 is $V_{MAX}$, the relation of $V_{IN\_MAX} < V_{MAx}$ is satisfied. For example, in the case of a delta-sigma analog-to-digital converter ($\Delta\Sigma$ADC), the maximum value $V_{IN\_MAX}$ of the input level is equal to an internal reference voltage $V_{REF}$. However, the reference voltage $V_{REF}$ is generated by using, for example, a so-called bandgap-voltage generator and an amplifier. Therefore, with respect to a supply voltage $V_{DD}$, the relation of $V_{REF} < V_{DD}$ is satisfied and the relation of $V_{IN\_MAX} < V_{MAX}$ is guaranteed. In other words, in the normal operating state, the relation of $V_{IN} < V_{IN\_MAX} = V_{REF} < V_{MAX}$ is satisfied. In the testing state for the optical connection, the relation of $V_{IN\_MAX} = V_{REF} < V_{IN} < V_{MAX}$ is satisfied.

Therefore, in the normal operating state, the analog signal input is sampled by the analog-to-digital converter 4 with the sampling period and converted into the n-bit digital signal. For example, in the case of the $\Delta\Sigma$ADC, the analog signal is converted into one-bit digital signal.

Then, the digital signal and the clock signal are encoded into one transmitting signal by the encoder 5. The output of the encoder 5, i.e., the transmitting signal, drives the electrooptical transducer 7 such as an LED with the driver 6 via the transmission controller 8 and is output as the optical signal. In this case, the transmission controller 8 does not affect the normal operating state because the switching element 9 selectively outputs the output of the driver 6.

In the testing state for the optical connection, the output of the driver 6 does not reach the electrooptical transducer 7 such as an LED because the switching element 9 outputs the analog signal input. In this case, the electrooptical transducer 7 directly receives the analog signal which is input to the optical transmitter 2 because the analog signal is directly input to the electrooptical transducer 7. Therefore, the current flowing through the electrooptical transducer 7 can be controlled by controlling the input signal.

Next, the optical receiver 3 will now be described.

The optical receiver 3 includes an optoelectrical transducer 11, a decoder 12, an output buffer 13, and a receiving controller 14. These are formed in the same semiconductor substrate to provide a one-chip structure.

The optoelectrical transducer 11 converts a received optical signal into an electrical signal and outputs the electrical signal as a receiving signal. The optoelectrical transducer 11 includes a light receiving element 11a such as photodetector (PD) that receives an optical signal and a transimpedance amplifier 11b that converts a current output from the light receiving element 11a into a voltage and outputs the voltage.

The decoder 12 consists of a clock regenerator 12a that regenerates a clock signal from an output of the optoelectrical transducer 11, i.e., the receiving signal, and a data decoder 12b that regenerates the output of the analog-to-digital converter 4. In other words, the decoder 12 outputs a regenerated digital signal and a regenerated clock signal. In the case where the analog-to-digital converter 4 of the optical transmitter 2 is a $\Delta\Sigma$ADC, the regenerated digital signal is one-bit digital signal and can be output as a regenerated analog signal by being passed through a low-pass filter. The clock regenerator 12a consists of, for example, a delay lock loop (DLL), a phase-locked loop (PLL), etc.

The output buffer 13 is a circuit that drives an output load and outputs the regenerated digital signal $V_{OUT}$ and the regenerated clock signal CLK. The input and the output of the decoder 12 and an input of the output buffer 13 are controlled by the receiving controller 14.

The receiving controller 14 outputs one selected from the output of the decoder 12 and the output of the optoelectrical transducer 11 depending on an average duty ratio of the output of the optoelectrical transducer 11.

In other words, the receiving controller 14 outputs the output of the optoelectrical transducer 11 to the output buffer 13 via the decoder 12 when the average duty ratio of the output of the optoelectrical transducer 11 is within decision values (thresholds). The receiving controller 14 outputs the output of the optoelectrical transducer 11 to the output buffer 13 when the average duty ratio of the output of the optoelectrical transducer 11 is not within decision values (thresholds).

Here, the average duty ratio of the output of the optoelectrical transducer 11 is a time average of the output of the optoelectrical transducer 11, i.e., the receiving signal, and the average duty ratio is obtained by, for example, passing the receiving signal through a low-pass filter. An averaging time can be set by a cut off frequency of the low-pass filter.

The decision values are the values compensated for the specified values of the average duty ratio D of the transmitting signal of the output of the encoder 5 with the amount of pulse-width distortion of the electrooptical transducer 7 and optoelectrical transducer 11. The thresholds are the upper limit and the lower limit of the decision values. As described above, the specified values of the average duty ratio D of the transmitting signal of the output of the encoder 5 are values defined by the encoding scheme of the optical transmitter 2. The amount of pulse-width distortion is a difference of H periods of the transmitting signal and the output of the optoelectrical transducer 11, i.e., the receiving signal, and is the amount of change of duty ratios.

The receiving controller 14 includes switching elements 15 and 16 and a switch controller 17.

The switching element 15 outputs the output of the optoelectrical transducer 11 to the decoder 12 or the switching element 16. The switching element 16 outputs the output of the decoder 12 or the output of the optoelectrical transducer 11 via the switching element 15. The switch controller 17 controls the switching elements 15 and 16.

Figure 2:
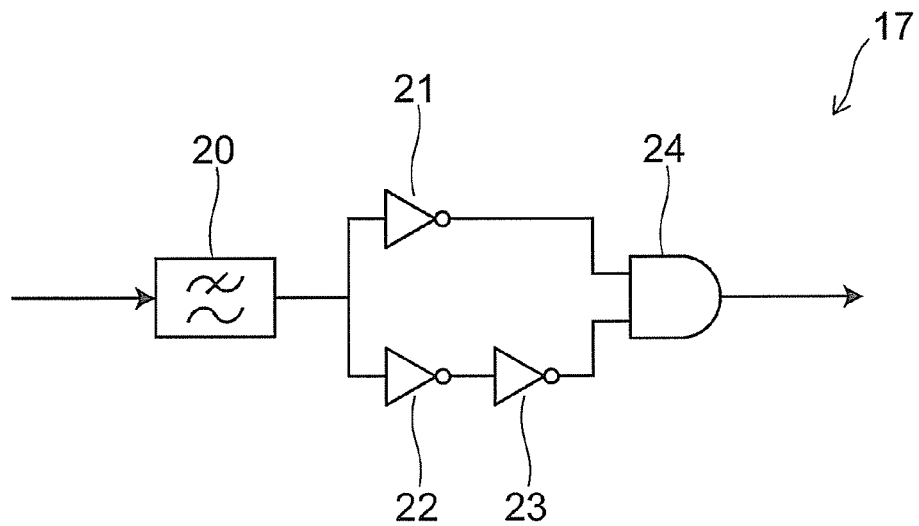
FIG. 2 is a circuit diagram illustrating the configuration of a switch controller of the optically coupled insulating device illustrated in FIG. 1.

FIG. 2 is a circuit diagram illustrating the configuration of a switch controller of the optically coupled insulating device illustrated in FIG. 1.

As illustrated in FIG. 2, the switch controller 17 includes a low-pass filter 20, inverters (INVs) 21 to 23, and a logical AND (AND) 24. The low-pass filter 20 outputs the average value of the output of the optoelectrical transducer 11. The output voltage of the low-pass filter 20 varies depending on the duty ratio of the output of the optoelectrical transducer 11 and is middle value $V_{DD}/2$ when the duty ratio is 50%. Here, $V_{DD}$ is a supply voltage. The low-pass filter 20 may be an active filter or a passive filter including resistors and capacitors.

The output of the low-pass filter 20 is input to the INVs 21 and 22. The logical threshold voltages of the INVs 21 and 22 are set to the boundary values of the decision values of the duty ratio. For example, $V_{DD} \cdot 3/4$ and $V_{DD}/4$ are set, respectively. The output of the INV 22 is inverted by the INV 23 and is input to the AND 24. The AND 24 outputs the logical multiplication of the output of the INV 21 and the output of the INV 23.

The AND 24 outputs H when the average duty ratio is within the specified values and outputs L when the average duty ratio is not within the specified values. In the case where the logical threshold voltages of the INVs 21 and 22 are set to, for example, $V_{DD} \cdot 3/4$ and $V_{DD}/4$, respectively, the AND 24 outputs H when the output voltage of the low-pass filter 20 is from $V_{DD}/4$ to $V_{DD} \cdot 3/4$; and the AND 24 outputs L when the output voltage of the low-pass filter 20 is from 0 to $V_{DD}/4$ or from $V_{DD} \cdot 3/4$ to $V_{DD}$. Alternatively, the outputs of the switch controller 17 may be inverted depending on the logic. The AND 24 may output L when the output voltage of the low-pass filter 20 is from $V_{DD}/4$ to $V_{DD} \cdot 3/4$; and the AND 24 may output H when the output voltage of the low-pass filter 20 is from 0 to $V_{DD}/4$ or from $V_{DD} \cdot 3/4$ to $V_{DD}$.

Referring again to FIG. 1, the switch controller 17 controls the switching elements 15 and 16 depending on the average duty ratio of the output of the optoelectrical transducer 11. In other words, when the average duty ratio is within the decision values, the switch controller 17 controls the switching elements 15 and 16 so that the output of the optoelectrical transducer 11 is input to the decoder 12 and the output of the decoder 12 is input to the output buffer 13. In contrast, when the average duty ratio is not within the decision values, the switch controller 17 controls the switching elements 15 and 16 so that the output of the optoelectrical transducer 11 is input to the output buffer 13.

The output of the optoelectrical transducer 11 may be output to either the regenerated digital signal $V_{OUT}$ or the regenerated clock signal CLK when the average duty ratio is not within the decision values as described above. Hereinafter, the case is described where the output of the optoelectrical transducer 11 is output to the regenerated clock signal CLK.

The optically coupled insulating device 1 includes the optical transmitter 2 and the optical receiver 3. Each of the optical transmitter 2 and the optical receiver 3 is formed in a semiconductor substrate. These are packaged and provided as one device. The input and the output of the optically coupled insulating device 1 are electrically insulated because a ground of the optical transmitter 2 and a ground of the optical receiver 3 are independent from each other.

The electrooptical transducer 7 of the optical transmitter 2 and the optoelectrical transducer 11 of the optical receiver 3 are coupled with the optical signal. In other words, the optical connection 18 consists of the electrooptical transducer 7 and optoelectrical transducer 11 including the light receiving element 11a and the transimpedance amplifier 11b.

The light intensity of the light signal reaching to the light receiving element 11a of the optoelectrical transducer 11 varies due to various factors, for example, the temperature, aging degradation of the light emitting element, and the like.

For example, in the case where the light emitting element of the electrooptical transducer 7 is a LED and the light receiving element is a PD, the light intensity $P_O$ received by the PD is shown in formula (1).

$$P_O = \frac{CE}{100} \times \eta \times If \tag{1}$$

Here, If (A) is a current flowing through the LED, η (W/A) is luminous efficacy of the LED, and CE (%) is coupling efficiency of the LED and the PD.

For example, the current If flowing through the LED is affected by variations of IC processes. The luminous efficacy η degrades due to high temperature and aging degradation. The coupling efficiency CE is affected by variations of assembling, aging degradation of mold and resin, and the like. Therefore, the light intensity $P_O$ received by the light receiving element 11a may vary with various values.

The light intensity $P_O$ received by the light receiving element 11a needs to be greater than a certain value for error-free transmission to the optical receiver 3. The conversion efficiency of the light receiving element 11a is taken as Se (A/W), and the input current for error-free transmission to the optical receiver 3 is taken as $I_{IN}(A)$. Then, a relation shown in formula (2) is required.

$$I_{IN} \geq Se \times P_O = Se \times \frac{CE}{100} \times \eta \times If \quad (2)$$

The optical connection 18 needs to be tested in a testing process because error-free transmission is impossible when formula (2) is not satisfied. The aim of testing for the optical connection 18 is verification that error-free transmission is possible under temperature change and aging degradation of a LED and the like. Herein, "error-free transmission" denotes that an error rate of the receiving signal is sufficiently low.

Simplified testing methods are preferable in the testing process. As simplified methods, there is a method for testing whether data can be transmitted from the optical transmitter 2 to the optical receiver 3 under simulated variation of the light intensity due to temperature change and aging degradation. In other words, the method is for measuring the output of the optoelectrical transducer 11 while the current of the electrooptical transducer 7 is forcibly and externally controlled. Namely, only products in which the output of the optoelectrical transducer 11 is within specified values are shipped after passing a current smaller than that in the normal operating state. Further, it is preferable that the testing process described above is executed by a direct-current.

As described above, the optical transmitter 2 of the optically coupled insulating device 1 according to the embodiment is set in the normal operating state or the testing state for the optical connection depending on the input level of the analog signal to be input. For example, when the input level $V_{IN}$ of the analog signal input is less than $V_{IN\_MAX}$, the optically coupled insulating device 1 is set in the normal operating state. When the input level $V_{IN}$ of the analog signal input is greater than $V_{IN\_MAX}$, the optically coupled insulating device 1 is set in the testing state for the optical connection. Here, $V_{IN\_MAX}$ is the maximum value of the input level of the analog-to-digital converter 4.

As described above, the average duty ratio D of the transmitting signal is within the specified values determined by the encoding scheme in the normal operating state. The average duty ratio D of the transmitting signal is 0 or 1 in the testing state for the optical connection because the analog signal to be input is a direct-current.

The optical receiver 3 is automatically set in the normal operating state or the testing state for the optical connection depending on the average duty ratio of the output of the optoelectrical transducer 11, i.e., the receiving signal. The optical receiver 3 is automatically set in the normal operating state or the testing state for the optical connection depending on whether the average duty ratio of the receiving signal is within the decision values or not.

Therefore, the optical transmitter 2 is set in the testing state for the optical connection and is able to output the analog signal in a direct-current by setting the input level of the optically coupled insulating device 1 in the level of the testing state for the optical connection. At the time, the optical receiver 3 is automatically set to the testing state for the optical connection because the average duty ratio of the output of the optoelectrical transducer 11 is not within the decision values. In other words, the output of the optoelectrical transducer 11 is directly output.

As described above, in the testing state for the optical connection, the electrooptical transducer 7 responds to the analog signal input to the optically coupled insulating device 1, and the output of the optoelectrical transducer 11 is directly output via the output buffer 13. The output of the optically coupled insulating device 1 is a direct-current output with respect to the analog signal input.

Therefore, controlling the input current can control the current flowing through the electrooptical transducer 7. The output voltage of the optoelectrical transducer 11 at the time is detected by the output voltage of the optically coupled insulating device 1, and the voltage can be tested whether it is within the specified values. This testing for the optical connection is performed by a direct-current.

In the case where the input level of the optically coupled insulating device 1 is the level of the normal operation, the optical transmitter 2 is set in the normal operating state. In the normal operating state, the analog signal input is converted into the digital signal; encoded with the clock signal; and emitted from the electrooptical transducer 7 as the optical signal.

In this case, the optical receiver 3 is controlled to the normal operating state because the average duty ratio of the output of the optoelectrical transducer 11 is within the decision values.

As described above, in the optical receiver 3 of the optically coupled insulating device 1 according to the embodiment, control to the testing state for the optical connection or the normal operating state is automatically performed by the receiving controller 14 depending on the average duty ratio of the output of the optoelectrical transducer 11.

For example, in the case where the transmission controller 8 is not used, the current of the electrooptical transducer 7 cannot be forcibly and externally controlled. Therefore, it is not suitable for the direct-current testing of the testing method described above. In other words, because the encoder 5 of the optical transmitter 2 outputs edged-pulse signals and PWM signals but cannot perform a direct-current operation, the testing described above cannot be performed in the product testing process.

In the case where the receiving controller 14 is not used, the optical receiver 3 firstly needs to detect whether the optical transmitter 2 is in the testing state for the optical connection or the normal operating state. As described above, the operating state of the optical transmitter 2 can be changed externally by the input level. However, it is generally difficult to change externally the operating state of the optical receiver 3.

In the case where the optical receiver 3 is in the normal operating state, both the regenerated digital signal $V_{OUT}$ and the regenerated clock signal CLK output from the output buffer 13 are digital signals. Therefore, each potential of the signals varies from the minimum potential to the maximum potential, i.e., the supply voltage $V_{DD}$.

Therefore, to control externally the operating state of the optical receiver 3, the optical receiver 3 needs to be in the testing state for the optical connection when a voltage of not less than the supply voltage $V_{DD}$ and not more than a withstand voltage $V_{MAX}$ is input to the output buffer 13.

As described above, in the case where the operating state of the optical receiver 3 is controlled using an external signal controls, the supply voltage $V_{DD}$, the withstand voltage $V_{MAX}$, and a control voltage $V_{CNT}$ must satisfy the relation of $V_{DD} < V_{CNT} < V_{MAX}$. However, an ultra-fine process cannot be used to satisfy this withstand voltage $V_{MAX}$, and this results in increasing in cost of semiconductor circuits. Therefore, to control externally the operating state of the optical receiver 3 is generally difficult.

In contrast, the operating state of the optically coupled insulating device 1 according to the embodiment can be automatically determined by the received optical signal because the optical receiver 3 includes the receiving controller 14.

Therefore, in the optically coupled insulating device 1 according to the embodiment, the optical connection 18, i.e., the optical connection of the electrooptical transducer 7 and the light receiving element 11a can be easily tested.

In addition, as described above, in the case where the ΔΣADC is used as the analog-to-digital converter 4, the regenerated analog signal can be output by passing the digital signal $V_{OUT}$ through a low-pass filter.

Figure 3:
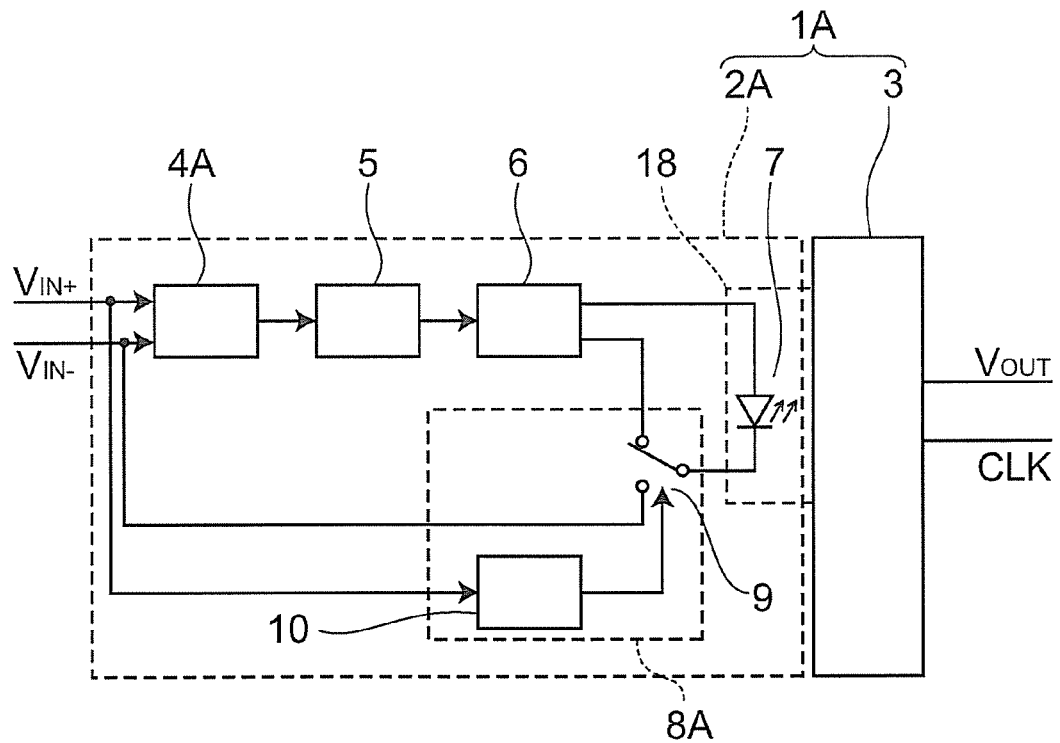
FIG. 3 is a block diagram illustrating the configuration of another optical transmitter according to the embodiment.

FIG. 3 is a block diagram illustrating the configuration of another optical transmitter according to the embodiment.

As illustrated in FIG. 3, the optical transmitter 2A includes an analog-to-digital converter 4A, an encoder 5, a driver 6, an electrooptical transducer 7, and a transmission controller 8A. The analog-to-digital converter 4A, the encoder 5, the driver 6, and the transmission controller 8A are formed in the same semiconductor substrate to provide a one-chip structure.

In other words, the optical transmitter 2A has a configuration in which the analog-to-digital converter 4 and the transmission controller 8 of the optical transmitter 2 illustrated in FIG. 1 are replaced with the analog-to-digital converter 4A and the transmission controller 8A, respectively. The encoder 5, the driver 6, and the electrooptical transducer 7 are similar to those of the optical transmitter 2 illustrated in FIG. 1.

The analog-to-digital converter 4A differs from the analog-to-digital converter 4 illustrated in FIG. 1 in differential inputs having a non-inverting input and a inverting input.

The transmission controller 8A includes a switching element 9 and a switch controller 10. The switching element 9 outputs an output of the driver 6 or an inverting input of the analog signal. The switch controller 10 controls the switching element 9 depending on an input level $V_{IN+}$ of a non-inverting input of the analog signal.

For example, the switch controller 10 controls the switching element 9 to the normal operating state when the non-inverting input level $V_{IN+}$ of the analog signal is less than $V_{IN\_MAX}$. The switch controller 10 controls the switching element 9 to the testing state for the optical connection when the non-inverting input level $V_{IN+}$ of the analog signal is greater than $V_{IN\_MAX}$. Here, $V_{IN\_MAX}$ is the maximum value (full scale) of the input level of the analog-to-digital converter 4A.

The transmission controller 8A selectively outputs the output of the driver 6 in the case of the normal operating state and the inverting input of the analog signal in the case of the testing state for the optical connection to the electrooptical transducer 7.

Therefore, in the normal operating state, the analog signal input is converted into the digital signal by the analog-to-digital converter 4A and encoded by the encoder 5 to the transmitting signal in which the output of the analog-to-digital converter 4A is superimposed onto the clock signal. Then, the output of the encoder 5, i.e., the transmitting signal, drives the electrooptical transducer 7, for example, a LED, via the transmission controller 8A by the driver 6, and is emitted as the optical signal. In this case, the transmission controller 8A does not affect the normal operation because the switching element 9 selectively outputs the output of the driver 6.

In the testing state for the optical connection, the output of the driver 6 does not reach the electrooptical transducer 7, for example, a LED, because the switching element 9 selectively outputs the inverting input of the analog signal. In this case, a current drawn in the inverting input flows through the electrooptical transducer 7. Therefore, the current flowing through the electrooptical transducer 7 can be controlled by controlling the current of the inverting input.

The current of the electrooptical transducer 7 in the testing state for the optical connection is easily controlled because the optical transmitter 2A has differential inputs.

The optically coupled insulating device 1A is configurable by using the optical transmitter 2A.

The optically coupled insulating device 1A includes an optical transmitter 2A and an optical receiver 3. Here, the optical receiver 3 is similar to the optical receiver 3 illustrated in FIG. 1. Each of the optical transmitter 2A and the optical receiver 3 is formed in a semiconductor substrate. These are packaged and provided as one device. The input and the output of the optically coupled insulating device 1A are electrically insulated because a ground of the optical transmitter 2A and a ground of the optical receiver 3 are independent from each other.

The electrooptical transducer 7 of the optical transmitter 2A and the optoelectrical transducer 11 of the optical receiver 3 are coupled at the optical connection 18.

Each of the optical signals emitted from the electrooptical transducer 7 in the testing state for the optical connection and the normal operation state is similar to that of the optical transmitter 2.

The optical transmitter 2A is controlled to the testing state for the optical connection by setting the non-inverting input level $V_{IN+}$ of the analog signal to the level of the testing state for the optical connection, for example, $V_{IN+}>V_{IN\_MAX}$. The optical transmitter 2A is controlled to the normal operating state by setting the non-inverting input level $V_{IN+}$ of the analog signal to the level of the normal operating state, for example, $V_{IN+}<V_{IN\_MAX}$. The optical receiver 3 is automatically set in the normal operating state or the testing state for the optical connection as described above.

In the testing state for the optical connection, the inverting input of the optically coupled insulating device 1A is connected to the electrooptical transducer 7 and is directly output via the optoelectrical transducer 11 of the optical receiver 3 to, for example, a regenerated clock terminal. In testing state for the optical connection, the output of the optically coupled insulating device 1A is a direct-current output with respect to the analog signal input.

Therefore, the current flowing through the electrooptical transducer 7 is controlled by controlling the inverting input current. Measurements of the inverting input current of the optically coupled insulating device 1A and the output voltage of the optoelectrical transducer 11 at the time enable testing whether the output voltage is within the specified values. This testing process for the optical connection is performed by a directly-current. For example, by passing a current smaller than that in the normal operating state through the LED, a testing can be performed whether a good optical connection is possible even in the case where the emission intensity of the LED is weak. In other words, the product testing can be performed to verify the operation under degradation of luminous efficacy due to temperature raise and aging degradation.

In the normal operating state, the analog signal input is converted into the digital signal; encoded with the clock signal; and emitted from the electrooptical transducer 7 as the optical signal.

The optical receiver 3, which has received this optical signal, is automatically set in the normal operating state and outputs the regenerated digital signal $V_{OUT}$ and the regenerated clock signal CLK. As described above, the regenerated analog signal may be output by smoothing the regenerated digital signal $V_{OUT}$ with a low-pass filter.

In the optically coupled insulating device 1A according to the embodiment, the optical connection 18 can be easily tested because the non-inverting input level $V_{IN+}$ can change the operating state to the normal operating state or the testing state for the optical connection.

The current flowing through the electrooptical transducer 7 may be easily controlled because the optically coupled insulating device 1A according to the embodiment has differential inputs.

As described above, the non-inverting input level $V_{IN+}$ controls the switch controller 10 of the transmission controller 8A. However, the inverting input level $V_{IN-}$ may control the switch controller 10, and the non-inverting input may be input to the electrooptical transducer 7 via the switching element 9.

As described above, each of the optical receivers 3 and 3A is controlled to the normal operating state or the testing state for the optical connection depending on the average duty ratio of the output of the optoelectrical transducer 11. Therefore, the encoding scheme in which the average duty ratio D of the transmitting signal is an appropriate value is preferable.

The output of the encoder 5, i.e., the average duty ratio D of the transmitting signal varies depending on the digital signal output from the analog-to-digital converter 4 or 4A.

The case where a $\Delta\Sigma$ADC that outputs, for example, one-bit data is used as the analog-to-digital converter 4 or 4A will now be described. That is, the output digital signal of the $\Delta\Sigma$ADC is one bit of H or L.

The case is described where the encoding scheme of the encoder 5 is converted into the pulse of the duty ratio $D_1$ or $D_2$, respectively when the digital signal is H or L in the sampling period (sampling frequency $f_S$). The amount of the pulse-width distortion of the optical connection 18 is taken as $\Delta tp$. In other words, the H period of the digital signal input to the optical connection 18 varies by the amount of the pulse-width distortion $\Delta tp$ at the output of the optical connection 18.

In the above condition, the average duty ratio $D_H$ of the output of the optical connection 18 is shown in formula (3) when the digital signal is always H.

$$D_H = D_1 \pm \Delta tp \cdot f_S \times 100(\%) \quad (3)$$

The average duty ratio $D_L$ of the output of the optical connection 18 is shown in formula (4) when the digital signal is always L.

$$D_L = D_2 \pm \Delta tp \cdot f_S \times 100(\%) \quad (4)$$

Therefore, the average duty ratio of the output of the optical connection 18, i.e., the receiving signal, is within the values $D_L$ and $D_H$ given in formulas (3) and (4), respectively.

For example, in the case of encoding with the pluses of $D_1 = 25\%$ and $D_2 = 75\%$, the average duty ratio is 25% to 75% even if the amount of the pulse-width distortion $\Delta tp$ is zero. Further, if the clock frequency (sampling frequency) $f_S$ is 10 MHz and the amount of the pulse-width distortion $\Delta tp$ is ±10 ns, the average duty ratio is 15% to 85%.

The signal having this average duty ratio is passed through a low-pass filter to detect the average duty ratio of the output of the optical connection 18. In the case above, the output of the low-pass filter is $0.15V_{DD}$ to $0.85V_{DD}$, and this fluctuates widely depending on the output pattern of the analog-to-digital converter 4 or 4A. Herein, $V_{DD}$ is the supply voltage.

Therefore, the decision values of the average duty ratio of the receiving controller 14 of the optical receiver 3 are $0.15V_{DD}$ to $0.85V_{DD}$. The optical receiver 3 goes into the normal operating state when the average duty ratio is within the decision values, i.e., $0.15V_{DD}$ to $0.85V_{DD}$. The optical receiver 3 goes into the testing state for the optical connection when the average duty ratio is not within the decision values, i.e., less than $0.15V_{DD}$ or greater than $0.85V_{DD}$.

On the other hand, the receiving controller 14 preferably constructed as a digital circuit not as an analog circuit with respect to power consumption and a chip area. However, a digital circuit in which the logical threshold is not within $0.15V_{DD}$ to $0.85V_{DD}$ may have a large chip area and may be disadvantage in cost. Therefore, the encoding scheme in which the average duty ratio D is independent from the digital signal of the output of the analog-to-digital converter 4 or 4A is preferable.

The encoding schemes in which the average duty ratio D does not fluctuate with respect to the data pattern of the digital signal include, for example, an encoding scheme using the Manchester code. In this encoding scheme, when the digital signal input in the sampling period is H, a signal HL is assigned such that H is in the first half period of the sampling period and L is in the second half period thereof. Further, when the digital signal is L, a signal LH is assigned such that L is in the first half period of the sampling period and H is in the second half period thereof. The signal LH is an inverted signal of the signal HL described above.

Each of the signals HL and LH described above has a duty ratio of 50%, and the transmission speed becomes double. However, the average duty ratio D is independent from the data pattern and is 50%. Here, the sampling period is $1/f_S$, where $f_S$ is a clock frequency which is equal to the sampling frequency.

Therefore, the average duty ratio of the output of the optical connection 18 is $50 \pm \Delta tp \times f_S \times 100\%$ when the Manchester code is used. For example, in the above numerical example, the average duty ratio is 40% to 60% and the switch controller 17 of the receiving controller 14 is easily constructed as a digital circuit.

However, in the case where the decoder 12 regenerates the regenerated clock signal from the output of the optical connection 18, i.e., the receiving signal, the Manchester code is unsuitable when the raising edge of the receiving signal is used.

Figures 4, 5:
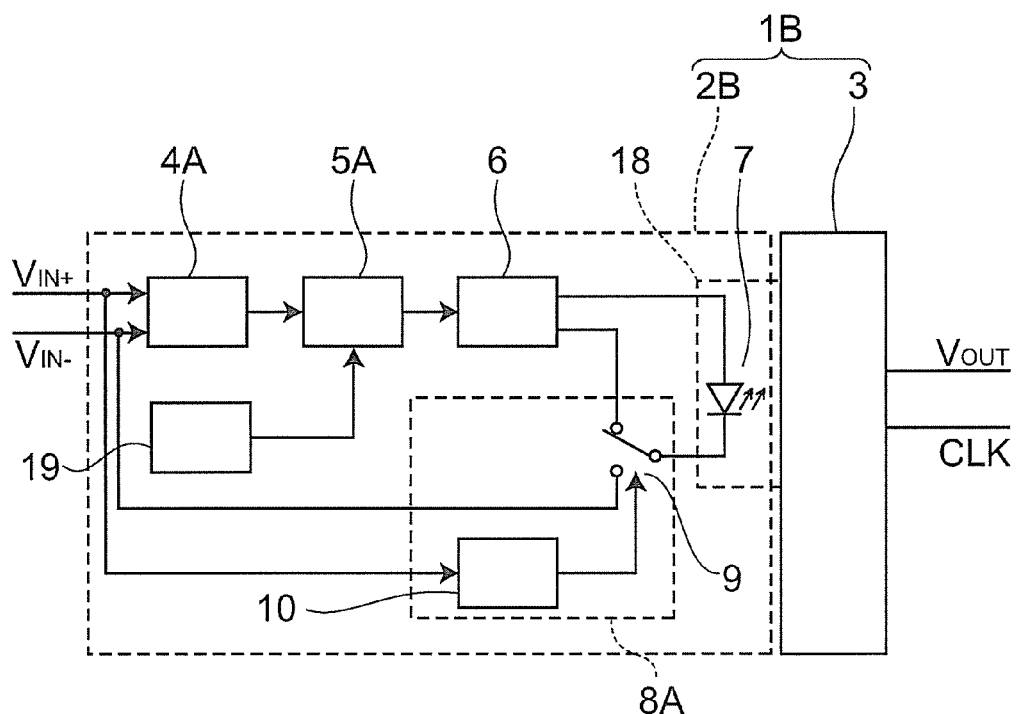
FIG. 4 is a block diagram illustrating the configuration of still another optical transmitter according to the embodiment.
FIG. 5 is a truth table of inputs and outputs of an encoder.

FIG. 4 is a block diagram illustrating the configuration of still another optical transmitter according to the embodiment.

As illustrated in FIG. 4, the optical transmitter 2B includes an analog-to-digital converter 4A, an encoder 5A, a driver 6, an electrooptical transducer 7, a transmission controller 8A, and a scramble signal generator 19. In the optical transmitter 2B, the analog-to-digital converter 4A, the encoder 5A, the driver 6, the transmission controller 8A, and the scramble signal generator 19 are formed in the same semiconductor substrate to provide a one-chip structure.

In other words, the optical transmitter 2B has a configuration in which the encoder 5 of the optical transmitter 2A illustrated in FIG. 3 is replaced with the encoder 5A and the scramble signal generator 19 is added. The analog-to-digital converter 4A, the driver 6, the electrooptical transducer 7, and the transmission controller 8A are similar to those of the optical transmitter 2A illustrated in FIG. 3.

The scramble signal generator 19 generates a scramble signal, i.e., outputs H or L synchronized with a sampling period. For example, the scramble signal generator 19 outputs an alternating signal synchronized with the raising of the clock signal or pseudo random binary bit sequence (PRBS) generated by the clock signal.

The encoder 5A generates the transmitting signal depending on two-bit data of the output of the analog-to-digital converter 4A and the output of the scramble signal generator 19.

The case where a ΔΣADC that outputs, for example, one-bit data is used as the analog-to-digital converter 4A will now be described. That is, the output digital signal of the ΔΣADC is one bit of H or L.

The encoder 5A is a PWM encoder in which the two-bit data of the scramble signal and the output of the ΔΣADC are encoded into four pulses having duty ratios of $W_1$, $W_2$, $W_3$, and $W_4$ and the pulse period synchronized with the clock signal. The transmitting signal is the signal in which the output of the ΔΣADC and the scramble signal are superimposed onto the signal based on the clock signal.

FIG. 5 is a truth table of inputs and outputs of the encoder 5A. Decoding can be also performed based on the truth table shown in FIG. 5.

Herein, the probability that the digital signal of the output of the ΔΣADC is going to be H is taken as x, and the probability that the scramble signal is going to be H is taken as y. The average duty ratio D=D (x, y) of the output of the encoder 5A is shown in formula (5).

$$D(x, y) = (1-x)(1-y)W_1 + x(1-y)W_2 + (1-x)yW_3 + xyW_4 \quad (5)$$
$$= W_1 + x(W_2 - W_1) + y(W_3 - W_1) + xy(W_1 - W_2 - W_3 + W_4)$$

As shown in formula (5), the average duty ratio D is dependent on the probability x that the digital signal of the output of the ΔΣADC is going to H. The average duty ratio D is independent from the probability x when formula (6) is satisfied.

$$\frac{\partial D(x, y)}{\partial x} = (W_2 - W_1) + y(W_1 - W_2 - W_3 + W_4) = 0 \quad (6)$$

Therefore, the average duty ratio D is independent from the probability x when the combination of duty ratios $W_1$, $W_2$, $W_3$, and $W_4$ of the pulse period satisfies formula (6) with respect to the scramble signal of the probability y.

Further, in the case where the probability y of the scramble signal varied, the value of formula (7) needs to be minimized in order to minimize the influence on the encoder 5.

$$\frac{\partial D(x, y)}{\partial y} = (W_3 - W_1) + x(W_1 - W_2 - W_3 + W_4) \quad (7)$$

Therefore, when the combination of duty ratios of W1, W2, W3, and W4 of the pulse period are satisfied formula (6) and further minimize the value of formula (7), the average duty ratio D of the output of the encoder 5A is in a constant value with respect to any value of the output of the ΔΣADC.

FIRST EXAMPLE

Here, an example of the duty ratio of the pulse period which satisfies formula (6) will now be described.

For example, when each of the probability of H and the probability of L of the scramble signal is 50%, i.e., y=0.5, and the duty ratios of the pulse period are $W_1$=20%, $W_2$=40%, $W_3$=80%, and $W_4$=60%, respectively, formula (6) is satisfied.

Figure 6:
FIG. 6 is a schematic view of a truth table of inputs and outputs and pulse waveforms.
Figure 6:
Figure 6:
Figure 6:

FIG. 6 schematically shows pulse waveforms and a truth table of inputs and outputs of the encoder 5A in the case of using the numerical example recited above.

Therefore, in the combinations, the average duty ratio D of the output of the encoder 5A is in a constant value with respect to any value of the output of the ΔΣADC. The average duty ratio D=D (x, y) being in this constant value is obtained from formula (8), which is an alteration of formula (5).

$$D(x, y) = W_1 + y(W_3 - W_1) + x\left(\frac{\partial D(x, y)}{\partial x}\right) \quad (8)$$
$$= W_1 + y(W_3 - W_1)$$

According to formula (8), the average duty ratio D of the output of the encoder 5A is determined by the probability y of H of the scramble signal and the duty ratios $W_1$ and $W_3$ of the pulses. In the case of using the numerical example recited above, the average duty ratio D of the output of the encoder 5A is kept in a constant value of 50% because the value of the formula (8) is 50%. Therefore, the same effect can be obtained as the case of using the Manchester code.

In the case where the duty ratios of the pulses illustrated above are set to $W_1$=20%, $W_2$=40%, $W_3$=80%, and $W_4$=60%, the minimum pulse width is 20% of the clock signal. For example, when the encoder 5A and the decoder 12 are constructed with synchronous circuits, the operating speed is five times faster than the clock signal.

SECOND EXAMPLE

The encoder 5A may be constructed as the PWM encoder of which inputs are encoded into three pulses. For example, the duty ratios of $W_1$=$W_3$=0.5 and $W_2$+$W_4$=1 of pulses satisfy formula (6). Further, it can be set to, for example, $W_2$=0.25 and $W_4$=0.75. Under these conditions, the L output of the ΔΣADC is encoded into the pulse having a duty ratio of 50%; and the H output of the ΔΣADC is encoded into the pulse having a duty ratio of 25% or 75% depending on the L or H of the scramble signal, respectively. The duty ratios of $W_2$=$W_4$=0.5 and $W_1$+$W_3$=1 of pulses satisfy also formula (6). Further, it can be set to, for example, $W_1$=0.25 and $W_3$=0.75. Under these conditions, the H output of the ΔΣADC is encoded into the pulse having a duty ratio of 50%; and the L output of the ΔΣADC is encoded into the pulse having a duty ratio of 25% or 75% depending on the L or H of the scramble signal, respectively.

Figure 7:
FIG. 7 is a schematic view of another truth table of inputs and outputs and pulse waveforms.
Figure 7:
Figure 7:
Figure 7:

FIG. 7 schematically shows pulse waveforms and a truth table of inputs and outputs of the encoder 5A in the case of using the numerical example recited above.

In the case where the duty ratios of the pulses are set to $W_1$=$W_3$=0.5, $W_2$=0.25, and $W_4$=0.75 and the case where the duty ratios of the pulses are set to $W_2$=$W_4$=0.5, $W_1$=0.25, and $W_3$=0.75, the cases satisfy formula (6) as described above. Therefore, the average duty ratio D of the output of the encoder 5A is kept in a constant value of 50% with respect to any output value of the ΔΣADC. Further, under these conditions, the minimum pulse width is 25% in the period of the clock signal, and the operating speed of the encoder 5A and the decoder 12 are decreased to four times of the clock signal.

As described above, the scramble signal may be an alternating signal synchronized with the raising of the clock signal or a PRBS generated by the clock signal. For example, the scramble signal generator 19 may consist of a PRBS generator in which the output is inverted for every clock signal. The PRBS generator includes a toggle flip-flop (TFF) or m (m being an integer not less than 2) flip-flops (FFs).

It is preferable to use the PRBS rather than the alternating signal as the scramble signal because the output of the ΔΣADC may alternate H and L. However, when the ΔΣADC is equal to or greater than the second-order, this is not applicable.

The optically coupled insulating device 1B includes an optical transmitter 2B and an optical receiver 3. Here, the optical receiver 3 is similar to the optical receiver 3 illustrated in FIG. 1. Each of the optical transmitter 2B and the optical receiver 3 is formed in a semiconductor substrate. These are packaged and provided as one device. The input and the output of the optically coupled insulating device 1B are electrically insulated because a ground of the optical transmitter 2B and a ground of the optical receiver 3 are independent from each other.

The electrooptical transducer 7 of the optical transmitter 2B and the optoelectrical transducer 11 of the optical receiver 3 are coupled by the optical signal. In other words, the input and the output of the optically coupled insulating device 1B are coupled by the optical signal of the optical connection 18.

The optical signal emitted from the electrooptical transducer 7 is similar to those of the optical transmitters 2 and 2A.

The optical transmitter 2B is controlled to the testing state for the optical connection or the normal operating state depending on the non-inverting input level $V_{IN+}$ of the analog signal. The optical receiver 3 is automatically set to the normal operating state or the testing state for the optical connection.

In the testing state for the optical connection, the inverting input of the optically coupled insulating device 1B is connected to the electrooptical transducer 7 and is directly output via the optoelectrical transducer 11 of the optical receiver 3. For example, the inverting input is output to the regenerated clock terminal. In testing state for the optical connection, the output of the optically coupled insulating device 1B is a direct-current with respect to the analog signal input. This testing process for the optical connection is performed by a directly-current.

In the normal operating state, the analog signal input is converted into the digital signal, encoded with the clock signal, and emitted from the electrooptical transducer 7 as the optical signal.

The optical receiver 3, which has received this optical signal, is automatically set to the normal operating state and outputs the regenerated digital signal $V_{OUT}$ and the regenerated clock signal CLK. As described above, the regenerated analog signal may be output by smoothing the regenerated digital signal $V_{OUT}$ with a low-pass filter.

In the optically coupled insulating device 1B according to the embodiment, the optical connection 18 can be easily tested because the non-inverting input level $V_{IN+}$ can change the operating state to the normal operating state or the testing state for the optical connection.

In the optically coupled insulating device 1B, the average duty ratio D of the output of the encoder 5A is kept in a constant value in the normal operating state. Therefore, the decision values of the average duty ratio of the optical receiver 3 can be set in the narrow range, and the receiving controller 14 of the optical receiver 3 may be easily constructed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

The invention claimed is:

1. An optically coupled insulating device comprising:
an optical transmitter; and
an optical receiver,
the optical transmitter including:
an analog-to-digital converter configured to convert an analog signal into a digital signal;
an encoder configured to output a transmitting signal generated by encoding the digital signal;
a transmitting controller configured to switch an output to the transmitting signal or the analog signal; and
an electrooptical transducer configured to convert the output of the transmitting controller into an optical signal, and
the optical receiver receiving the optical signal, converting the optical signal into an electrical signal, and outputting the electrical signal.

2. The device according to claim 1, wherein the output of the transmitting controller is switched in response to an input level of the analog signal.

3. The device according to claim 2, wherein the transmitting controller outputs the transmitting signal in a case where the analog signal is less than a threshold of the input level, or the analog signal in a case where the analog signal is greater than the threshold of the input level.

4. The device according to claim 2, wherein differential inputs are input into the analog-to-digital converter, the transmitting controller switches the output to the transmitting signal or an inverting analog signal in response to a non-inverting input level, and the transmitting controller switches the output to the transmitting signal or a non-inverting analog signal in response to an inverting input level.

5. The device according to claim 1, wherein the transmitting controller has a switching element and a switch controller controlling the switching element.

6. The device according to claim 1, wherein the optical transmitter further includes a scramble signal generator configured to generate a scramble signal, and the encoder generates the transmitting signal in response to data of the digital signal and the scramble signal.

7. The device according to claim 6, wherein the encoder generates the transmitting signal having duty ratios in response to combinations including one bit of the digital signal and one bit of the scramble signal, and an average duty ratio of the transmitting signal is in a constant value.

8. The device according to claim 6, wherein the scramble signal is one of an alternating signal synchronized with a clock signal and a pseudo-random binary bit sequence signal generated by the clock signal.

9. The device according to claim 1, wherein the optical receiver includes:
an optoelectrical transducer configured to receive the optical signal and to convert the optical signal into the electrical signal;
a decoder configured to decode the electrical signal and to output a regenerated digital signal and a regenerated clock signal; and
a receiving controller outputting the regenerated digital signal and the regenerated clock signal in a case where the electrical signal is within thresholds, or the electrical signal in a case where the electrical signal is not within the thresholds.

10. The device according to claim 9, wherein the regenerated digital signal and the regenerated clock signal correspond to the transmitting signal, and the electrical signal output from the receiving controller corresponds to the analog signal.

* * * * *